United States Patent [19]
Köching et al.

[11] Patent Number: 4,701,118
[45] Date of Patent: Oct. 20, 1987

[54] APPARATUS FOR FILTERING PLASTICIZED MATERIALS IN EXTRUDERS

[75] Inventors: Horst Köching; Rolf-Rüdiger Stude, both of Münster, Fed. Rep. of Germany

[73] Assignee: Kreyenborg Verwaltungen und Beteiligungen KG, Münster-Kinderhaus, Fed. Rep. of Germany

[21] Appl. No.: 864,081

[22] Filed: May 16, 1986

[30] Foreign Application Priority Data

Jul. 3, 1985 [DE] Fed. Rep. of Germany ....... 3523743

[51] Int. Cl.⁴ .............................................. B29C 47/68
[52] U.S. Cl. .................................. 425/185; 210/234; 210/236; 425/198
[58] Field of Search ............... 425/185, 188, 192 R, 425/208, 197–199; 210/234, 236

[56] References Cited

U.S. PATENT DOCUMENTS

| 3,455,357 | 7/1969 | Zink | 425/197 X |
|---|---|---|---|
| 3,488,807 | 1/1970 | Vossen | 425/192 R |
| 3,669,166 | 6/1972 | Colin | 425/199 X |
| 3,900,399 | 8/1975 | Kreyenborg et al. | 210/236 |
| 4,025,434 | 5/1977 | Mladota | 210/236 |
| 4,070,138 | 1/1978 | Stanwood | 425/192 R X |
| 4,082,487 | 4/1978 | Rapp | 425/185 X |
| 4,167,384 | 9/1979 | Shirato et al. | 425/185 X |
| 4,511,472 | 4/1985 | Trott | 425/197 X |

FOREIGN PATENT DOCUMENTS

| 1800169 | 4/1970 | Fed. Rep. of Germany | 425/185 |
|---|---|---|---|
| 2256639 | 9/1978 | Fed. Rep. of Germany | . |
| 2942849 | 3/1983 | Fed. Rep. of Germany | 425/197 |

Primary Examiner—Richard L. Chiesa
Attorney, Agent, or Firm—Peter K. Kontler

[57] ABSTRACT

Apparatus for filtering a stream of plasticized synthetic plastic material in an extruder has a housing with four or more channels connecting a material-admitting inlet with a material-discharging outlet. The housing is formed with parallel bores each of which receives a single reciprocable cylindrical carrier of two or more filters or two independently reciprocable cylindrical carriers of discrete filters. Each carrier can be moved between a first position in which its filter or filters register with discrete channels of the housing and at least one additional position in which its filter or one of its filters is accessible. At least 75 percent of filtering capacity remains available when a filter is being inspected, cleaned or replaced. The carriers seal those channels which are not in line with filters while the carriers are out of their first positions.

11 Claims, 9 Drawing Figures

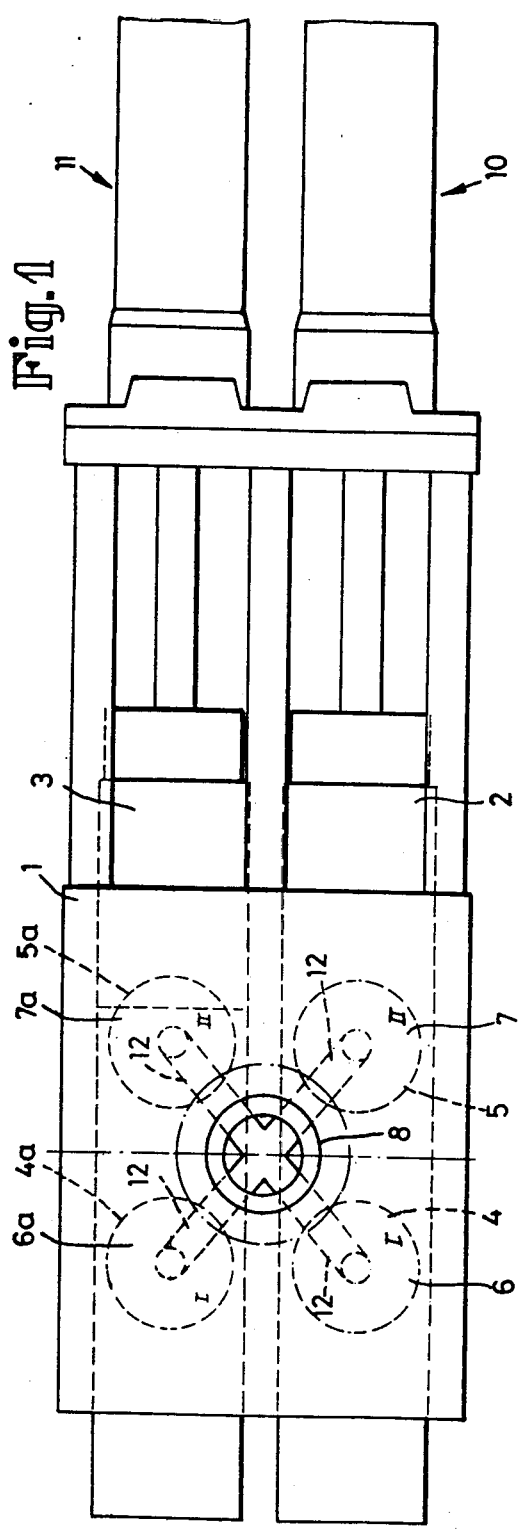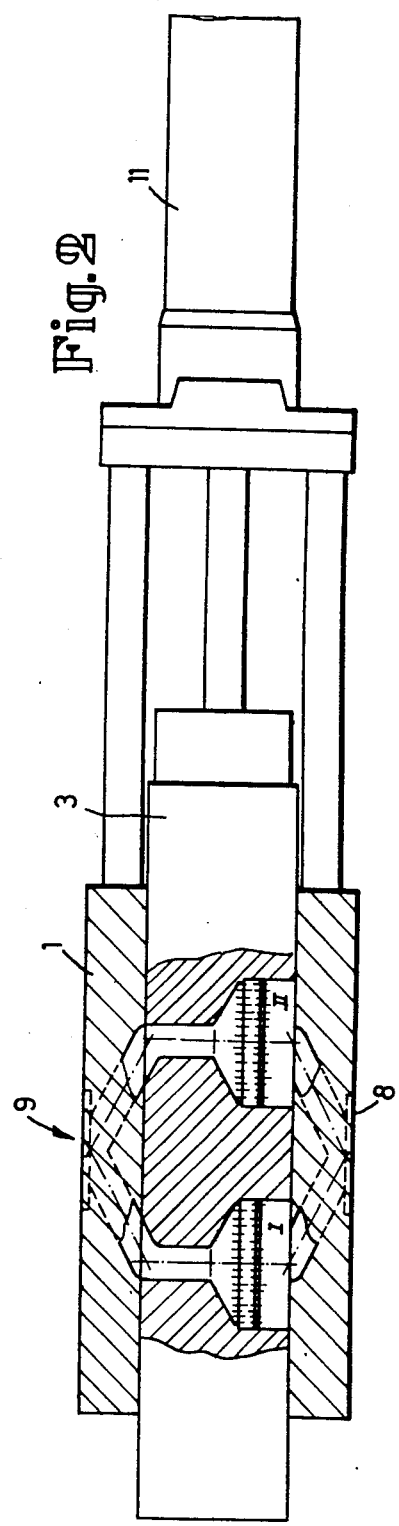

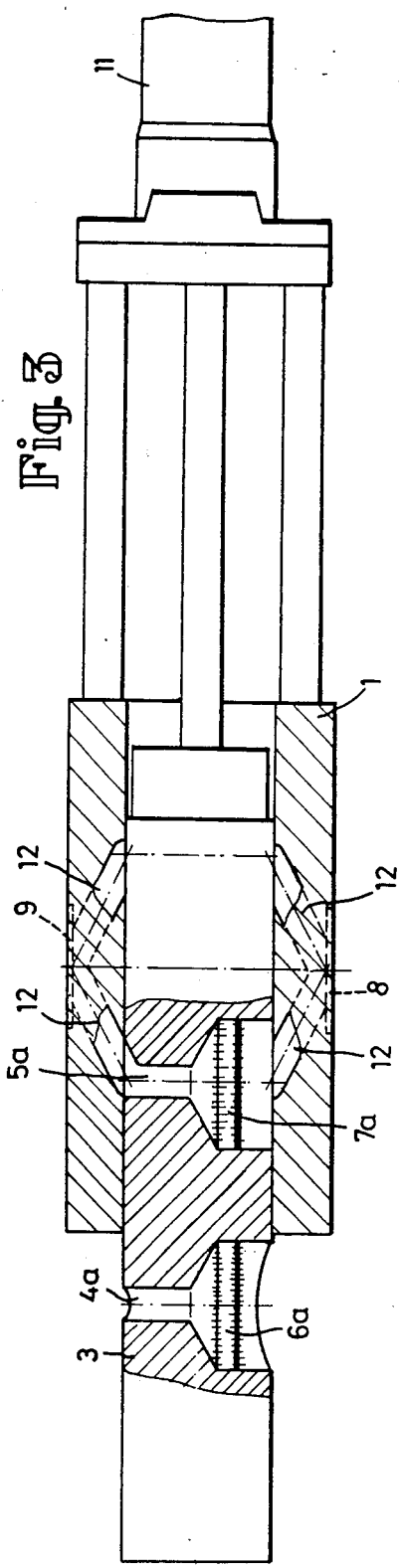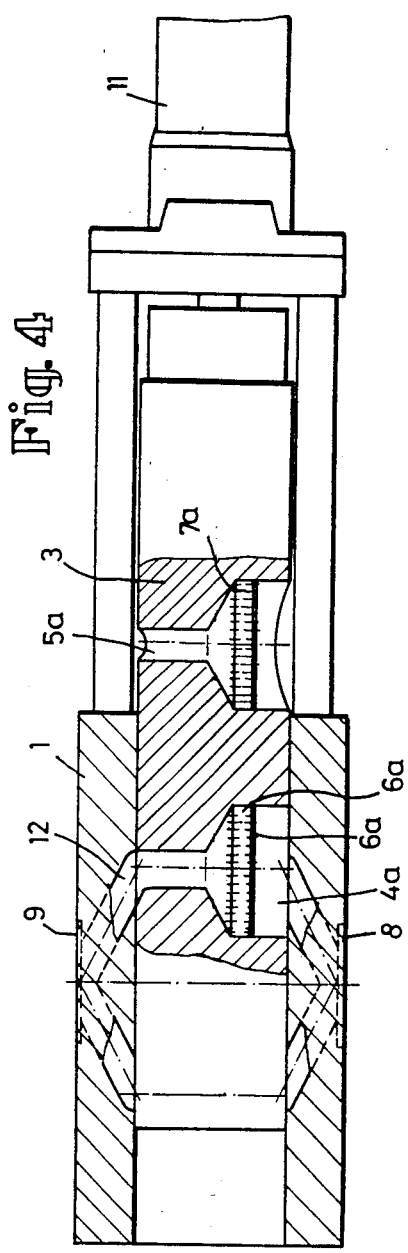

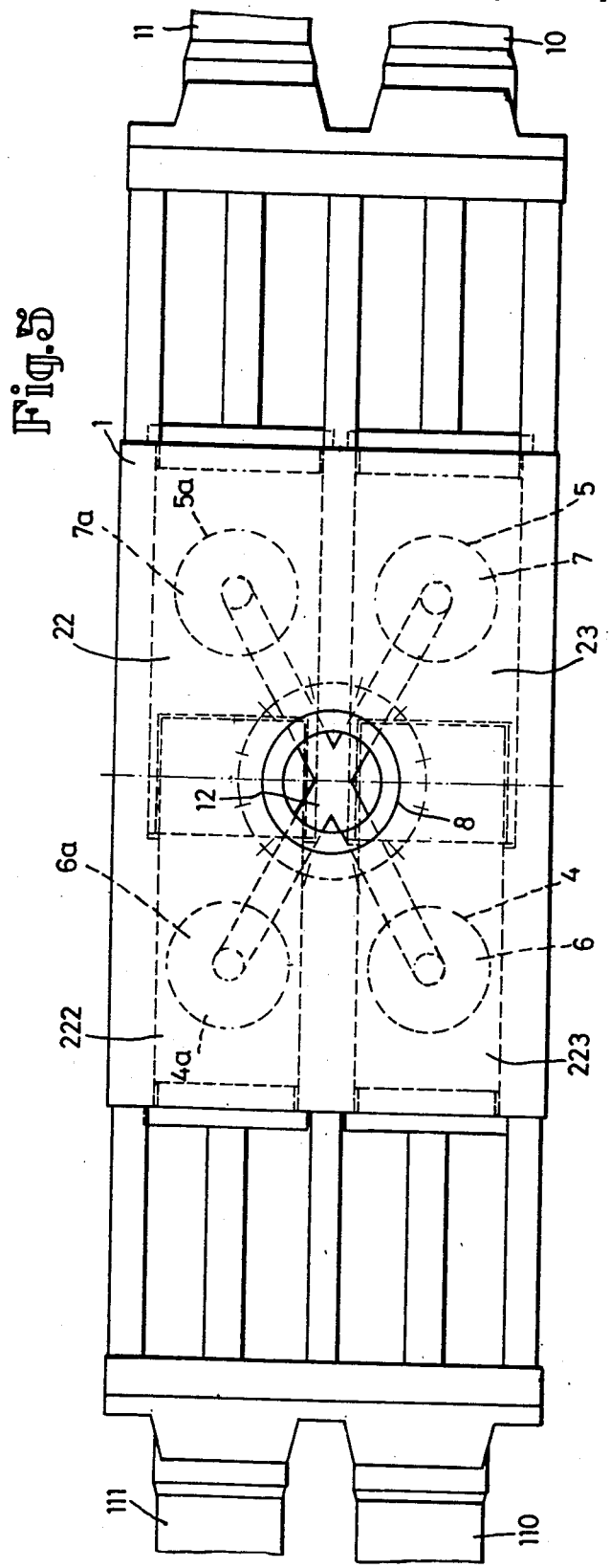

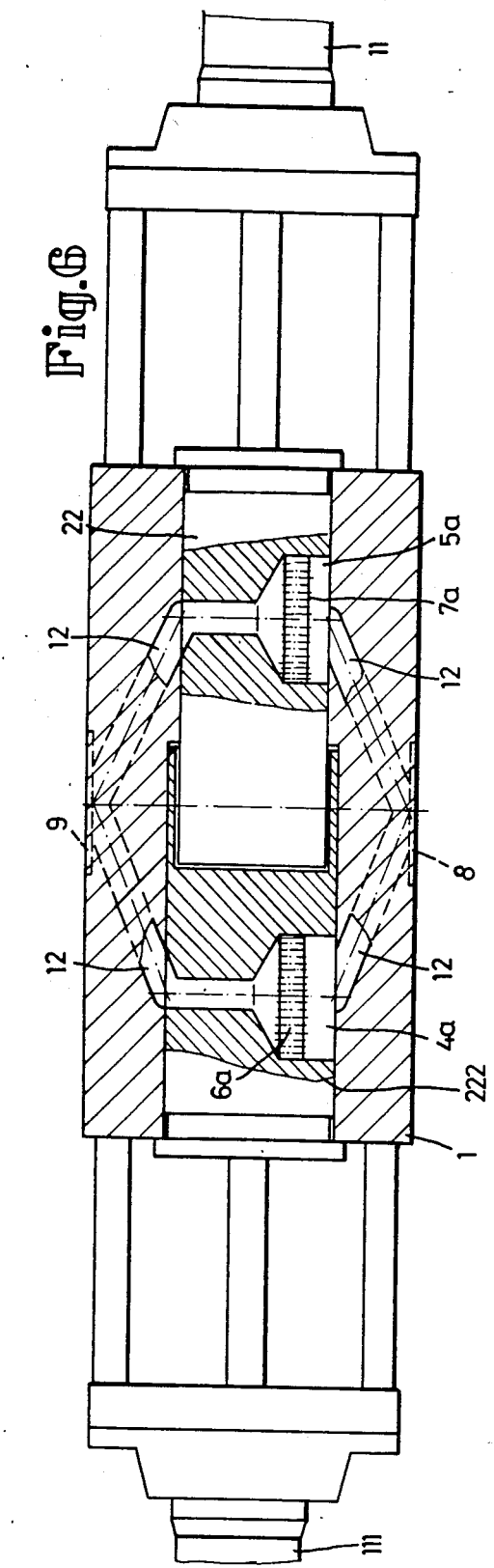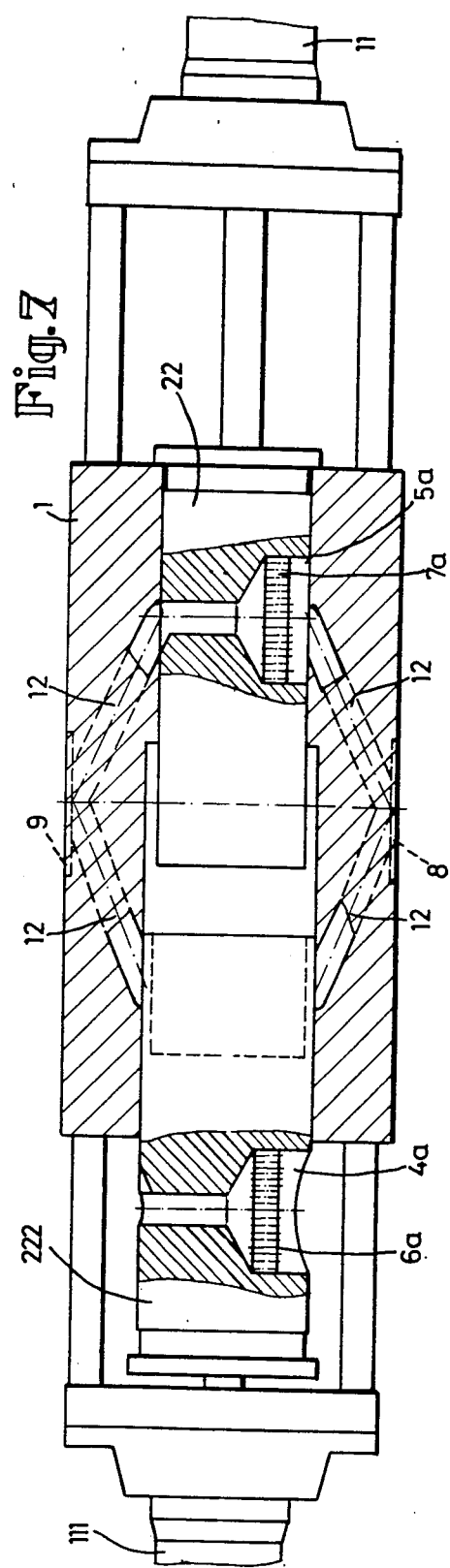

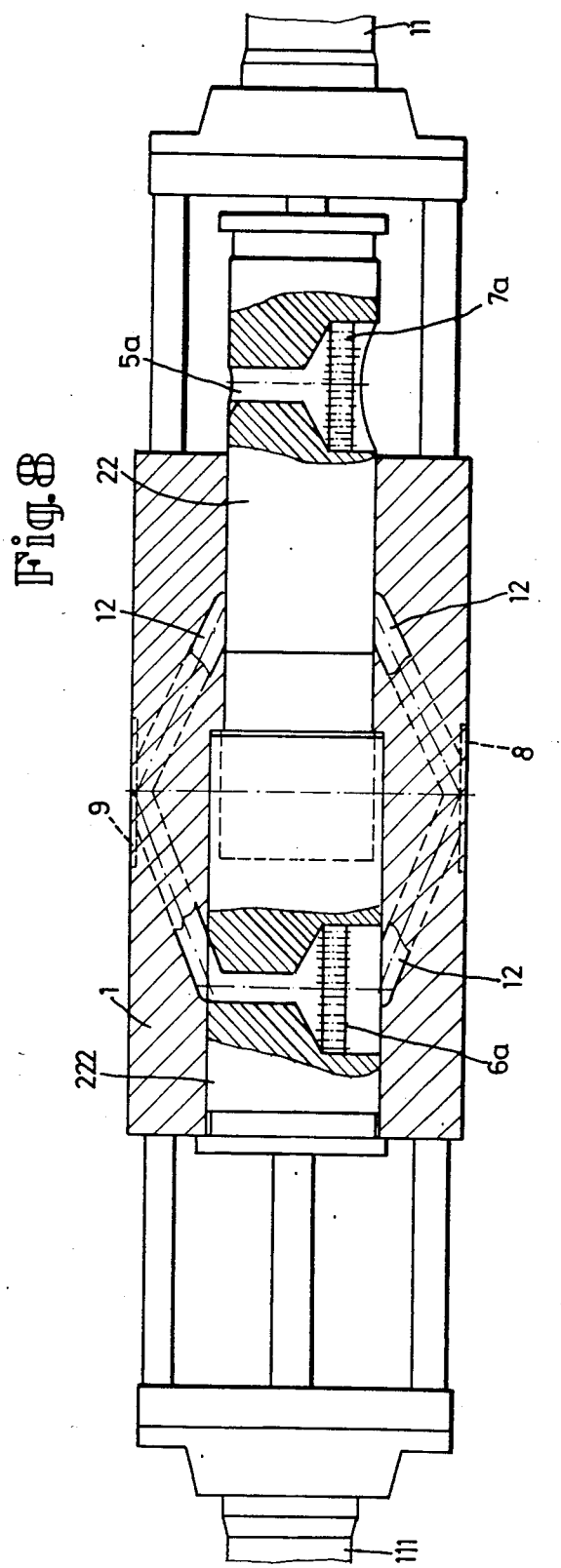

APPARATUS FOR FILTERING PLASTICIZED MATERIALS IN EXTRUDERS

BACKGROUND OF THE INVENTION

The invention relates to extruders and like machines wherein a stream of plasticized synthetic plastic material is caused to continuously flow into one or more mold cavities. More particularly, the invention relates to apparatus for filtering the flow or stream of plasticized synthetic plastic material in such machines.

German Auslegeschrift No. 18 00 169 discloses a filtering apparatus which can be used in an extruding or injection molding machine (hereinafter called extruder for short). The apparatus is constructed and assembled in such a way that it allows for replacement of a contaminated, damaged, clogged and/or otherwise affected filter without interrupting the flow of plasticized material from the inlet to the outlet of the housing for the filter and without permitting a bubble of air to interfere with predictable flow of plasticized material to the outlet. A drawback of the apparatus which is disclosed in this German publication is that it constitutes a bottleneck between the unit or units which are disposed upstream and the unit or units which are disposed downstream of the filtering station. The development of extruders has progressed to such an extent that the units upstream and downstream of the filtering station can form and process plasticized synthetic plastic material in quantities greatly exceeding those which can be filtered per unit of time in a conventional filtering apparatus.

Attempts to prevent the development of bottlenecks in the region of the filtering apparatus involve the utilization of large filters including huge sieves with correspondingly enlarged carriers for the sieves. This, in turn, creates problems in connection with the shifting of such carriers to and from the positions in which the sieves are accessible and to and from the positions in which the sieves are ready to intercept impurities and/or other foreign matter in the stream of plasticized synthetic plastic material. Moreover, the cost of large filters and outsized carriers for such filters is extremely high so that the increased cost does not warrant the utilization of such filters and carriers in existing extruders.

OBJECTS AND SUMMARY OF THE INVENTION

An object of the invention is to provide a novel and improved filtering apparatus which can employ relatively small filters and relatively small carriers for filters but is nevertheless capable of filtering streams of plasticized synthetic plastic materials which are conveyed at a rate as required in a modern high-speed extruder.

Another object of the invention is to provide a filtering apparatus which can employ filter carriers whose dimensions need not exceed those of heretofore utilized carriers.

A further object of the invention is to provide a filtering apparatus which can be used to intercept impurities and/or other foreign matter in the stream of plasticized synthetic material flowing at a rate which is required in modern high-speed extruders and like machines.

An additional object of the invention is to provide a novel and improved method of manipulating filters in the path of one or more streams of plasticized synthetic thermoplastic material in an extruder for the mass production of plastic articles.

Still another object of the invention is to provide an extruder which embodies the above outlined filtering apparatus.

A further object of the invention is to provide a filtering apparatus which can be used as a superior substitute for conventional filtering apparatus in existing extruders.

Another object of the invention is to provide a novel and improved housing for use in the above outlined filtering apparatus.

The invention is embodied in an apparatus for filtering a flowable synthetic plastic material in an extruder or a like machine. The improved apparatus comprises a housing having an inlet and an outlet for the flow of a stream of plastic material and at least four channels connecting the inlet with the outlet, and a plurality of carriers mounted in and movable relative to the housing between first and second positions. Each carrier has at least one passage in register with one of the channels in one position and out of register with the respective channel in the other position of the respective carrier. The apparatus further comprises filters for flowable synthetic plastic material in the passages of the carriers.

In accordance with one presently preferred embodiment of the invention, each carrier has two passages and the passages of each carrier register with two discrete channels in the one position of the respective carrier whereas a single passage registers with one of the channels in the other position of the respective carrier. The housing has a plurality of bores (e.g., two parallel bores each of which intersects two channels), and each carrier is reciprocable in a discrete bore of the housing.

In accordance with another presently preferred embodiment of the invention, each carrier has a single passage and two carriers are reciprocable relative to or with each other in each bore of the housing.

Each filter can constitute a self-sustaining prefabricated unit which is insertable into and removable from the single passage or from the respective passage of the corresponding carrier. The filters are accessible in the other positions of the respective carriers. Each carrier can constitute an elongated cylinder having at least one transversely extending hole constituting one of the passages. Discrete motors are preferably provided to move the carriers relative to the housing of the improved filtering apparatus.

The novel features which are considered as characteristic of the invention are set forth in particular in the appended claims. The improved filtering apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an elevational view of a filtering apparatus which embodies one form of the invention and comprises two filter carriers each of which is reciprocable in a discrete bore of the housing and supports two removable circular filters, both carriers being shown in positions in which their filters are in the process of filtering the plasticized synthetic plastic material;

FIG. 2 is a plan view of the apparatus of FIG. 1, with a portion of the housing broken away;

FIG. 3 is a similar plan view but showing one of the carriers in a first end position in which one of the filters therein is accessible for inspection and/or replacement while the other filter continues to extend across the path of a stream of plasticized material on its way from the inlet to the outlet of the housing;

FIG. 4 is another plan view showing the one carrier in a second end position in which the other filter therein is accessible but the one filter extends across the path of a stream of plasticized material from the inlet to the outlet of the housing;

FIG. 5 is an elevational view of a second apparatus wherein each carrier is provided with a single passage for a filter;

FIG. 6 is a plan view of the second apparatus with portions of the housing and the upper carriers broken away;

FIG. 7 is a similar plan view of the second apparatus but showing one of two coaxial upper carriers in its inoperative position;

FIG. 8 is a similar plan view but showing the other upper carrier in its inoperative position.

DESCRIPTION OF THE PREFERRED EMBODIMENTS

Figure 9:
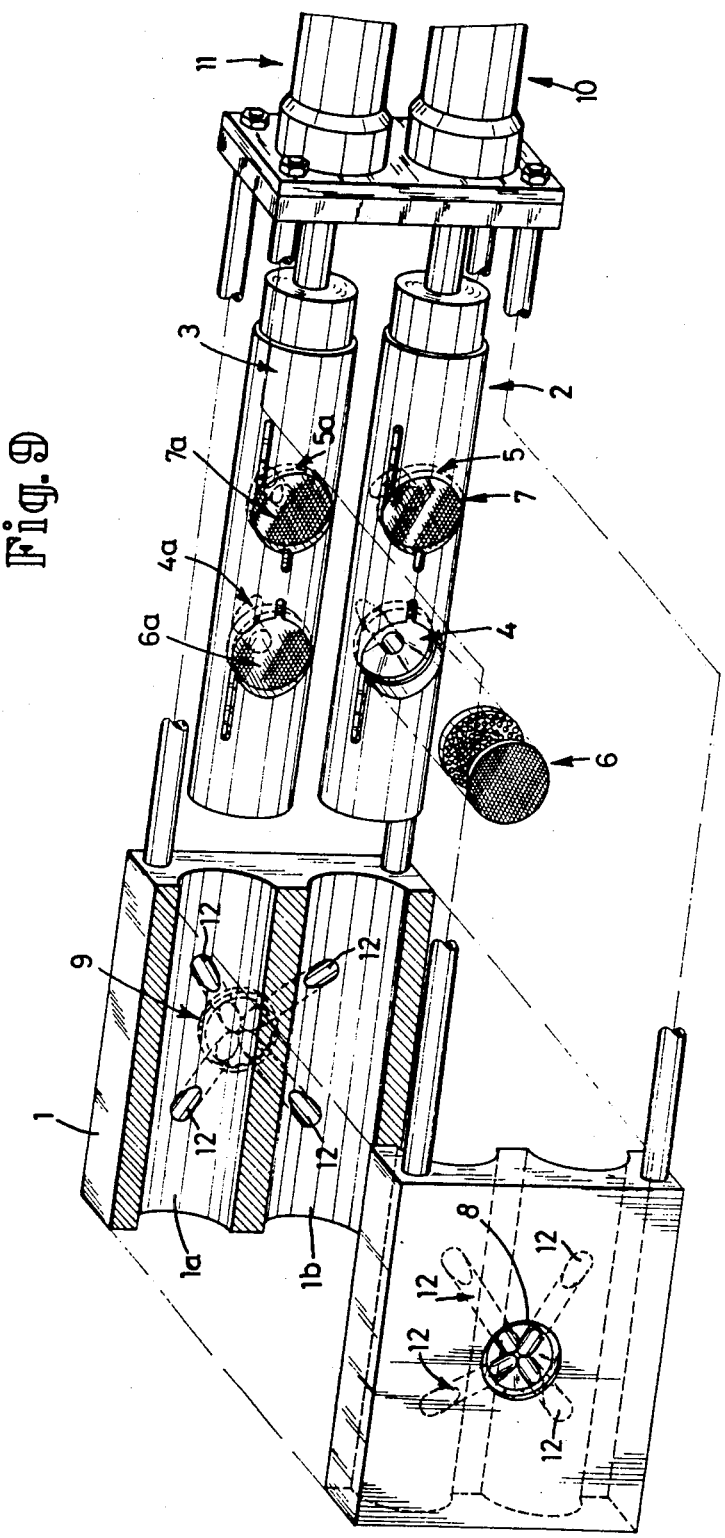
FIG. 9 is an exploded perspective view of the filtering apparatus of FIGS. 1-4, with portions of the housing broken away and one of the filters removed from its passage.

FIGS. 1 to 4 and 9 show a first embodiment of the improved filtering apparatus. This apparatus comprises a housing 1 having two horizontal bores 1a and 1b for discrete cylindrical filter carriers 2 and 3. The bores 1a and 1b are parallel to and are disposed above each other. The carrier 2 is formed with two transversely extending holes or passages 4, 5 and the carrier 3 is formed with two similar transversely extending holes or passages 4a, 5a. The passages 4, 5 receive removable prefabricated circular filters 6, 7 and the passages 4a, 5a receive removable prefabricated circular filters 6a, 7a.

The housing 1 has an inlet 8 for a stream of plasticized synthetic plastic material and an outlet 9 which is connected with the inlet 8 by four discrete channels 12. The upper two channels traverse the bore 1b and the lower two channels 12 traverse the bore 1a of the housing 1.

The means for reciprocating the carriers 2 and 3 comprises discrete double-acting fluid-operated (preferably hydraulic) motors 10 and 11 which are mounted on the housing and can be started and arrested by an operator or automatically in response to signals from a control panel or a control circuit, not shown.

The mode of operation of the filtering apparatus of FIGS. 1 to 4 and 9 is as follows:

In FIGS. 1 and 2, the motors 10 and 11 maintain the respective carriers 2 and 3 in their first or operative positions in which the filters 6, 7 in the respective passages 4, 5 register with the lower channels 12 and the filters 6a, 7a in the respective passages 4a, 5a register with the upper channels 12 of the housing 1. Thus, the stream of plasticized synthetic thermoplastic material which enters the housing 1 by way of the inlet 8 is subdivided into four equal or substantially equal smaller streams each of which flows through a discrete channel 12 and is thereby filtered by the corresponding filter (namely by the filter which registers with the respective channel). The operative positions of the filters 6 and 7 are denoted in FIG. 1 by the reference characters I and II, the same as the operative positions of the filters 6a and 7a.

FIG. 3 shows the carrier 3 for the filters 6a, 7a in a second position in which the filter 7a registers with one of the upper channels 12 but the filter 6a is accessible outside of the housing 1. This renders it possible to inspect, clean or replace the filter 6a while the remaining three filters 6, 7, 7a continue to intercept impurities (if any) in the streams of plasticized material which are caused to flow from the inlet 8 to the outlet 9 of the housing 1. The carrier 3 seals one of the two upper channels 12 not unlike a cylindrical valving element.

If the operator wishes to gain access to the filter 7a, the upper carrier 3 is caused to move in a direction to the right, as viewed in FIGS. 1, 2 or 3 so that the corresponding passage 5a is located outside of the housing 1 and the filter 7a is accessible for inspection, cleaning or replacement. This is shown in FIG. 4 wherein the filter 7a is accessible outside of the housing 1 while the filter 6a registers with one of the upper channels 12 and the carrier 3 seals the other upper channel 12. Thus, 75 percent of the filtering capacity is available at all times because the operator can gain access to any one of the four prefabricated filters 6, 7, 6a, 7a by the simple expedient of actuating the motor 10 or 11 so as to move the carrier 2 or 3 to one of its two end positions. If the operator wishes to gain access to the filter 6, the carrier 2 is moved to the left-hand end position so that the filter 6 is located outside of the housing 1, the carrier 2 seals one of the two lower channels 12 and the filter 7 is in register with the other lower channel 12. Analogously, the motor 10 is actuated to move the lower carrier 2 to its right-hand end position if the filter 7 is to be inspected. At such time, the carrier 2 seals one of the lower channels 12 and the filter 6 extends across the other lower channel 12.

The carrier 2, its filters 6, 7 and the motor 10 are omitted in FIGS. 3 and 4 for the sake of clarity.

FIGS. 5 to 8 show a modified filtering apparatus wherein the housing 1 is identical with the housing 1 of the apparatus of FIGS. 1-4 and 9 but the filters 6, 7, 6a, 7a are mounted in discrete carriers 223, 23, 222 and 22. Each carrier is reciprocable by a discrete motor (110, 10, 111, 11) and the carriers 22, 23 are respectively coaxial with the carriers 222 and 223. The operator can select that filter which is to be extracted from the housing 1 while the remaining three filters remain operative. FIG. 5 shows each of the four filters in its operative position, the same as FIG. 6. In FIG. 7, three of the four filters are in operative position with the filter 6a extracted from the housing 1 and accessible for inspection, replacement or cleaning. FIG. 8 shows the filter 7a in exposed position, with the other three filters operative.

The lower carriers 23, 223 and their motors 10, 110 are omitted in FIGS. 7 and 8 for clarity.

A carrier which is provided with a single filter is disclosed in German Pats. Nos. 22 56 639 and 29 42 849.

The improved filtering apparatus is susceptible of many additional modifications. For example, each of the two carriers 2, 3 shown in FIG. 9 can be provided with three transverse passages each of which receives a discrete filter. The housing 1 is then provided with a total of six channels and each of the carriers is movable between more than three different positions in one of which all three filters which are mounted therein are located in the path of a stream of plasticized material and in each other of which one or more filters which are mounted therein are accessible.

The illustrated embodiments exhibit the advantage that 75 percent of filtering capacity remain available during inspection, replacement or exchange of any selected filter. The percentage can be increased still further if the housing is provided with three or more bores each of which receives a single reciprocable carrier of two or more filters or a pair of carriers each of which can receive a discrete filter. A high percentage of filtering capacity is desirable and advantageous because this renders it possible to avoid unnecessary and undesirable pronounced rise in the pressure of conveyed plasticized material while a selected filter is accessible and/or undesirable reduction of the output of the machine which employs the improved filtering apparatus.

Another important advantage of the improved apparatus is that it can employ carriers whose diameters need not exceed those of conventional carriers, that it can utilize available means for moving the carriers relative to the housing, and that the carriers can be manufactured and machined in accordance with conventional techniques in spite of the fact that the filtering capacity of the apparatus during exchange of a selected filter is higher than that of conventional apparatus.

The above advantages are achieved due to the recognition that the inlet and outlet of the housing 1 can be connected with each other by several channels and that each such channel can contain a discrete filter when the apparatus operates at a maximum capacity whereas the plasticized mass can flow through at least two filters while the apparatus is operated at less than maximum capacity.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for filtering a flowable synthetic plastic material in an extruder, comprising a housing having an inlet and an outlet for a stream of plastic material and at least four discrete channels connecting said inlet with said outlet; a plurality of carriers mounted in and movable relative to said housing between a plurality of different positions, each of said carriers having at least one passage which is in register with one of said discrete channels of said housing in one position of the respective carrier and is accessible in another position of the respective carrier; and filters mounetd on said carriers in said passges for filtering flowable synthetic plastic material in said passages.

2. The apparatus of claim 1, wherein each of said carriers has two passages each of which registers with a different one of said discrete channels in the one position of the respective carrier.

3. The apparatus of claim 2, wherein said housing has a plurality of discrete bores and each of said carriers is reciprocable in one of said discrete bores of said housing.

4. The apparatus of claim 1, wherein each of said carriers has a single passage.

5. The apparatus of claim 4, wherein said housing has a plurality of bores each of which traverses two of said channels, said carriers including a pair of carriers in each of said bores and each carrier being reciprocable in its bore independently of the other carrier of the respective pair.

6. The apparatus of claim 1, wherein each of said filters includes a prefabricated unit which is insertable into and withdrawable from the respective carrier.

7. The apparatus of claim 1, wherein each of said filters is a circular filter.

8. The apparatus of claim 1, wherein each of said carriers includes an elongated cylinder having at least one diametrically extending hole constituting one of said passages.

9. The apparatus of claim 1, further comprising motor means for moving said carriers independently of each other.

10. The apparatus of claim 9, wherein said motor means comprises a plurality of double-acting fluid-operated motors.

11. The apparatus of claim 1, wherein each of said carriers has means for sealing at least one of said channels in said other position thereof.

* * * * *